United States Patent
Zhamu et al.

(10) Patent No.: US 12,451,480 B2
(45) Date of Patent: Oct. 21, 2025

(54) SURFACE-STABILIZED SELENIUM PARTICLES, ALKALI METAL-SELENIUM SECONDARY BATTERY CONTAINING SAME, AND METHOD OF MANUFACTURING

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 580 days.

(21) Appl. No.: 15/951,498

(22) Filed: Apr. 12, 2018

(65) Prior Publication Data

US 2019/0319262 A1    Oct. 17, 2019

(51) Int. Cl.
*H01M 4/58* (2010.01)
*H01M 4/04* (2006.01)
(Continued)

(52) U.S. Cl.
CPC ......... *H01M 4/366* (2013.01); *H01M 4/0404* (2013.01); *H01M 4/38* (2013.01);
(Continued)

(58) Field of Classification Search
CPC .. H01M 4/366; H01M 4/1393; H01M 4/1395; H01M 4/587; H01M 4/38;
(Continued)

(56) References Cited

U.S. PATENT DOCUMENTS

| | | | | |
|---|---|---|---|---|
| 2014/0178747 A1* | 6/2014 | Tsai | ...................... | H01M 4/5825 429/188 |
| 2015/0064575 A1* | 3/2015 | He | ........................ | H01M 4/625 429/300 |

(Continued)

FOREIGN PATENT DOCUMENTS

JP    4127989    *    7/2008

OTHER PUBLICATIONS

PCT/US19/26909 International Search Report and Written Opinion dated Jul. 29, 2019, 13 pages.

(Continued)

*Primary Examiner* — Lisa S Park (57) ABSTRACT

Provided is particulate for use in a lithium-selenium battery cathode, the particulate comprising one or a plurality of cathode active material particles (selected from Se, lithium polyselenide, sodium polyselenide, potassium polyselenide, a Se alloy or mixture with Sn, Sb, Bi, S, or Te, or a combination thereof) being embraced or encapsulated by a thin layer of a protecting polymer having a lithium ion conductivity from $10^{-8}$ S/cm to $5\times10^{-2}$ S/cm and a thickness from 0.5 nm to 10 μm, wherein the protecting polymer layer contains a polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, poly(vinylidene chloride), polydimethylsiloxane, poly(vinylidene fluoride)-hexafluoropropylene (PVDF-HFP), polyethylene glycol (PEG), chemical derivatives of PEG, poly(ethylene glycol diacrylate) (PEGDA), polyethylene glycol methyl ether (PEG-me), polyethylene glycol dimethyl ether (PEG-de), sulfonated polymers, interpenetrating polymer networks thereof, and combinations thereof.

19 Claims, 3 Drawing Sheets

(51) Int. Cl.
  H01M 4/36      (2006.01)
  H01M 4/38      (2006.01)
  H01M 4/587     (2010.01)
  H01M 4/62      (2006.01)
  H01M 10/0525   (2010.01)
  H01M 10/054    (2010.01)
  H01M 10/058    (2010.01)
  H01M 4/02      (2006.01)

(52) U.S. Cl.
  CPC .......... *H01M 4/581* (2013.01); *H01M 4/587* (2013.01); *H01M 4/624* (2013.01); *H01M 4/625* (2013.01); *H01M 4/628* (2013.01); *H01M 10/0525* (2013.01); *H01M 10/054* (2013.01); *H01M 10/058* (2013.01); *H01M 2004/021* (2013.01); *H01M 2004/028* (2013.01)

(58) Field of Classification Search
  CPC .... H01M 4/0404; H01M 4/581; H01M 4/624; H01M 4/625; H01M 4/628; H01M 10/0525; H01M 10/054; H01M 10/058; H01M 2004/021; H01M 2004/028; Y02E 60/10; Y02P 70/50
  See application file for complete search history.

(56) References Cited

U.S. PATENT DOCUMENTS

| | | |
|---|---|---|
| 2015/0221935 A1 | 8/2015 | Zhou et al. |
| 2016/0006075 A1 | 1/2016 | Tabuchi et al. |
| 2017/0194636 A1 | 7/2017 | Osada et al. |
| 2017/0194640 A1 | 7/2017 | Bucur et al. |
| 2017/0194648 A1 | 7/2017 | Bucur et al. |

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.

An et al., "Large-Scale Synthesis of High Quality Trigonal Selenium Nanowires" European Journal of Inorganic Chemistry (2003) vol. 17, pp. 3250-3255.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Karlicky et al., "Halogenated Graphenes: Rapidly Growing Family of Graphene Derivatives" ACS Nano (2013) vol. 7, No. 8, pp. 6434-6464.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

* cited by examiner

SURFACE-STABILIZED SELENIUM PARTICLES, ALKALI METAL-SELENIUM SECONDARY BATTERY CONTAINING SAME, AND METHOD OF MANUFACTURING

FIELD OF THE INVENTION

The present invention is related to a unique cathode composition and cathode structure in a secondary or rechargeable alkali metal-selenium battery, including the lithium-selenium battery, sodium-selenium battery, and potassium-selenium battery, and a method of producing same.

BACKGROUND OF THE INVENTION

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{44}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-180 mAh/g. As a result, the specific energy of commercially available Li-ion cells is typically in the range of 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). With a significantly higher electronic conductivity, Se is a more effective cathode active material and, as such, Li—Se potentially can exhibit a higher rate capability.

However, Li—Se cell is plagued with several major technical problems that have hindered its widespread commercialization:
(1) All prior art Li—Se cells have dendrite formation and related internal shorting issues;
(2) The cell tends to exhibit significant capacity decay during discharge-charge cycling. This is mainly due to the high solubility of selenium and lithium poly selenide anions formed as reaction intermediates during both discharge and charge processes in the polar organic solvents used in electrolytes. During cycling, the anions can migrate through the separator to the Li negative electrode whereupon they are reduced to solid precipitates, causing active mass loss. In addition, the solid product that precipitates on the surface of the positive electrode during discharge becomes electrochemically irreversible, which also contributes to active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.
(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into the mesoscaled pores of these materials using a physical vapor deposition or solution precipitation process. Typically the maximum loading of Se in these porous carbon structures is less than 50% by weight (i.e. the amount of active material is less than 50%; more than 50% being inactive materials).

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electroactive cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during repeated charges/discharges.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/kg, preferably greater than 350 Wh/kg, and more preferably greater than 400 Wh/kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium or sodium-selenium cell based on rational materials and battery designs that overcome or significantly reduce the following issues commonly associated with conventional Li—Se and Na—Se cells: (a) dendrite formation (internal shorting); (b) low electric and ionic conductivities of selenium, requiring large proportion (typically 30-55%) of non-active conductive fillers and having significant proportion of non-accessible or non-reachable selenium, or lithium or sodium polyselenide); (c) dissolution of lithium polyselenide or sodium polyselenide in electrolyte and migration of dissolved lithium/sodium polyselenide from the cathode to the anode (which irreversibly react with lithium/sodium at the anode), resulting in active material loss and capacity decay (the shuttle effect); and (d) short cycle life.

SUMMARY OF THE INVENTION

Herein reported is a cathode active material layer for a lithium-selenium or sodium-selenium battery that contains a very unique class of cathode active material. Specifically, the cathode active material particles are fully embraced or encapsulated by a protecting polymer that is capable of overcoming the cathode-induced rapid capacity decay problem commonly associated with a rechargeable lithium-selenium or sodium-selenium battery. The cathode active material particles are a selenium-based material preferably selected from Se, lithium polyselenide, sodium polyselenide, potassium polyselenide, a Se alloy or mixture with Sn, Sb, Bi, S, or Te, or a combination thereof.

In a preferred embodiment, the invention provides a cathode active material particulate for a lithium-selenium or sodium-selenium battery, preferably a rechargeable battery. The cathode active material particulate comprises one or a plurality of cathode active material particles being fully embraced or encapsulated by a thin layer of a protecting polymer. The cathode active material particles are selected from Se, lithium polyselenide, sodium polyselenide, potassium polyselenide, a Se alloy or mixture with Sn, Sb, Bi, S, or Te, or a combination thereof. The protecting polymer layer preferably has a thickness from 0.5 nm to 5 µm (preferably from 1 nm to 2 µm and more preferably <1 µm), and a lithium ion or sodium ion conductivity from $10^{-8}$ S/cm to $5\times10^{-2}$ S/cm at room temperature and the protecting polymer layer contains a polymer selected from poly(ethylene oxide) (PEO), polypropylene oxide (PPO), poly(acrylonitrile) (PAN), poly(methyl methacrylate) (PMMA), poly (vinylidene fluoride) (PVdF), poly bis-methoxy ethoxyethoxide-phosphazene, polyvinyl chloride, poly(vinylidene chloride), polydimethylsiloxane, poly(vinylidene fluoride)-hexafluoropropylene (PVDF-HFP), polyethylene glycol (PEG), a chemical derivative of PEG, poly(ethylene glycol diacrylate) (PEGDA), polyethylene glycol methyl ether, polyethylene glycol dimethyl ether, a sulfonated polymer, an interpenetrating polymer network thereof, or a combination thereof. The protecting polymer preferably has a lithium ion or sodium ion conductivity no less than $10^{-6}$ S/cm at room temperature (preferably and more typically no less than $10^{-4}$ S/cm and more preferably and typically no less than $10^{-3}$ S/cm).

Preferably, PEO, PAN, or PPO is an ultrahigh molecular weight polymer, having a molecular weight from $0.5\times10^6$ to $9.0\times10^6$ g/mole, more preferably from $1.0\times10^6$ to $6.0\times10^6$ g/mole.

The particulate (secondary particle) preferably has a diameter from 1 µm to 50 µm (more preferably from 5 µm to 20 µm) even though the primary particles (the constituent cathode active material particles) have a diameter or thickness from 1 nm to 5 µm (preferably less than 1 µm and further preferably less than 100 nm).

In certain preferred embodiments, the cathode active material particles are coated with a layer of carbon, graphene, electron-conducting polymer, or a combination thereof to form conductive material-coated particles prior to being embraced by the protecting polymer layer.

Preferably, the particulates are substantially or essentially spherical or ellipsoidal in shape. Also preferably, the particulate has a diameter or thickness smaller than 30 µm, more preferably smaller than 20 µm, and most preferably smaller than 10 µm.

The interpenetrating polymer network (IPN) can include a simultaneous polymer interpenetrating network (S—IPN), a sequential IPN or semi-interpenetrating network (semi-IPN).

The sulfonated polymer is preferably selected from the group consisting of sulfonated polyaniline, sulfonated polypyrrole, sulfonated polythiophene, sulfonated polyfuran, a sulfonated bi-cyclic polymer, poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidene fluoride (PVDF), sulfonated copolymers of polyvinylidene fluoride with hexafluoropropene and tetrafluoroethylene, sulfonated copolymers of ethylene and tetrafluoroethylene (ETFE), sulfonated polybenzimidazole (PBI), their chemical derivatives, copolymers, blends, and combinations thereof.

In certain embodiments, the protecting polymer contains an electrically conductive material dispersed therein. The electrically conducting material may be selected from an electron-conducting polymer, a metal particle or wire, a graphene sheet, a carbon fiber, a graphite fiber, a carbon nanofiber, a graphite nanofiber, a carbon nanotube, a graphite particle, an expanded graphite flake, an acetylene black particle, or a combination thereof. The electrically conducting material (e.g. metal nanowire, nanofiber, etc.) preferably has a thickness or diameter less than 100 nm and more preferably <10 nm.

In certain embodiments, the protecting polymer contains a lithium salt or sodium salt dispersed between chains of the protecting polymer. The lithium salt dispersed in the protecting polymer may be preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate(LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl) imide, lithium bis(fluorosulphonyl)imide, lithium trifluoromethanesulfonimide (LiTFSI), an ionic liquid-based lithium salt, or a combination thereof.

The sodium salt may be selected from sodium perchlorate ($NaClO_4$), sodium hexafluorophosphate ($NaPF_6$), sodium borofluoride ($NaBF_4$), sodium hexafluoroarsenide ($NaAsF_6$), sodium trifluoro-metasulfonate ($NaCF_3 SO_3$), bis-trifluoromethyl sulfonylimide sodium ($NaN(CF_3 SO_2)_2$), sodium bis(oxalato)borate(NaBOB), sodium oxalyldifluoroborate ($NaBF_2C_2O_4$), sodium oxalyldifluoroborate ($NaBF_2C_2O_4$), sodium nitrate ($NaNO_3$), Na-fluoroalkyl-phosphates ($NaPF_3(CF_2CF_3)_3$), sodium bisperfluoro-ethysulfonylimide (NaBETI), sodium bis(trifluoromethanesulphonyl)imide, sodium bis(fluorosulphonyl)imide, sodium trifluoromethanesulfonimide (NaTFSI), an ionic liquid-based sodium salt, or a combination thereof.

The cathode active material is preferably in a form of nanoparticle (spherical, ellipsoidal, and irregular shape, etc.), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

In some embodiments, one particle or a cluster of particles may be coated with or embraced by a layer of carbon disposed between the particle(s) and the protecting polymer layer (the encapsulating shell). Alternatively or additionally, a carbon layer may be deposited to embrace the encapsulated particle or the encapsulated cluster of multiple cathode active material particles.

The particulate may further contain a graphite, graphene, or carbon material mixed with the cathode active material particles and disposed inside the encapsulating or embracing polymer shell. The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

Preferably and typically, the protecting polymer layer has a lithium ion or sodium ion conductivity no less than $10^{-5}$ S/cm, more preferably no less than $10^{-3}$ S/cm, and most preferably no less than $10^{-2}$ S/cm. Some of the selected polymers exhibit a lithium-ion conductivity greater than $10^{-2}$ S/cm. In some embodiments, the protecting polymer is a neat polymer containing no additive or filler dispersed therein. In others, the protecting polymer is polymer matrix composite containing from 0.1% to 50% by weight (preferably from 1% to 35% by weight) of a lithium ion-conducting additive dispersed in a protecting polymer matrix material. In some embodiments, the protecting polymer contains from 0.1% by weight to 10% by weight of a reinforcement nanofilament selected from carbon nanotube, carbon nanofiber, graphene, or a combination thereof.

In some embodiments, the protecting polymer is mixed with an elastomer (to form a blend, co-polymer, or interpenetrating network) selected from natural polyisoprene (e.g. cis-1,4-polyisoprene natural rubber (NR) and trans-1, 4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the protecting polymer layer is a composite containing a lithium ion-conducting additive dispersed in a protecting polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

In some embodiments, the protecting polymer layer is a composite containing a sodium ion-conducting additive dispersed in a protecting polymer matrix. The sodium ion-conducting material may be selected from $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0 \leq x \leq 1$, $1 \leq y \leq 4$.

The protecting polymer may form a mixture, blend, co-polymer, or semi-interpenetrating network (semi-IPN) with an electron-conducting polymer selected from polyaniline, polypyrrole, polythiophene, polyfuran, a bi-cyclic polymer, derivatives thereof (e.g. sulfonated versions), or a combination thereof.

The present invention also provides a powder mass comprising a plurality of the presently invented particulates.

The present invention also provides a cathode electrode that contains the presently invented particulates of protecting polymer-encapsulated cathode active material particles, and an optional conductive additive (e.g. expanded graphite flakes, carbon black, acetylene black, or carbon nanotube), an optional (typically required) resin binder that bonds the particulates and the conductive additive together.

The present invention also provides a lithium-selenium or sodium-selenium battery containing an optional anode current collector, an anode active material layer, an invented cathode active material layer as described above, an optional cathode current collector, an electrolyte in ionic contact with the anode active material layer and the cathode active material layer and an optional porous separator. The lithium battery may be a lithium-ion battery or lithium metal battery (containing lithium metal or lithium alloy as the main anode active material and containing no intercalation-based anode active material). The sodium-selenium battery includes sodium metal-selenium cell and sodium ion-selenium cell.

The present invention also provides a method of manufacturing a lithium-selenium or sodium-selenium battery. The method includes (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically isolating (separating) the anode and the cathode.

The operation of providing the cathode active material layer includes fully embracing or encapsulating particles of a cathode active material (a selenium-based material selected from Se, lithium polyselenide, sodium polyselenide, potassium polyselenide, a Se alloy or mixture with Sn, Sb, Bi, S, or Te, or a combination thereof) by a protecting polymer layer to form protected particulates. The protecting polymer layer preferably has a thickness from 0.5 nm to 5 μm (preferably from 1 nm to 2 μm and more preferably <1 μm), and a lithium ion conductivity from $10^{-8}$ S/cm to $5 \times 10^{-2}$ S/cm at room temperature and the protecting polymer layer contains a polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, poly(vinylidene chloride), polydimethylsiloxane, poly(vinylidene fluoride)-hexafluoropropylene (PVDF-HFP), polyethylene glycol (PEG), a chemical derivative of PEG, poly(ethylene glycol diacrylate) (PEGDA), polyethylene glycol methyl ether, polyethylene glycol dimethyl ether, a sulfonated polymer, an interpenetrating polymer network thereof, or a combination thereof. The protecting polymer preferably has a lithium ion conductivity no less than $10^{-6}$ S/cm at room temperature (preferably and more typically no less than $10^{-4}$ S/cm and more preferably and typically no less than $10^{-3}$ S/cm).

Preferably, the protecting polymer layer has a lithium ion conductivity from $1 \times 10^{-4}$ S/cm to $5 \times 10^{-2}$ S/cm.

This presently invented protecting polymer layer appears to be capable of isolating (preventing) liquid electrolyte from being in direct physical contact with the cathode active material and, thus, preventing the dissolution of the cathode active material in the electrolyte. The dissolved selenium-based material (Se, lithium polyselenide, sodium polyselenide, potassium polyselenide, a Se alloy or mixture with Sn, Sb, Bi, S, or Te, or a combination thereof) can migrate to the anode side, react with the anode material (e.g. Li or Na metal) to form an inactive material and will not return to the cathode side. This otherwise could cause fast capacity decay.

In certain embodiments, the operation of providing a protecting polymer layer contains providing a mixture/blend/composite of a protecting polymer with an elastomer, an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nanofiber, and/or graphene), or a combination thereof.

In this mixture/blend/composite, the lithium ion-conducting material is dispersed in the protecting polymer and is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

In some embodiments, the lithium ion-conducting material is dispersed in the protecting polymer and is selected from lithium perchlorate, $LiClO_4$, lithium hexafluoro-phosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, LiN$(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-fluoroalkyl-phosphates, $LiPF_3(CF_2CF_3)_3$, lithium bisperfluoroethylsulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

Preferably, the cathode active material particles are coated with a layer of carbon or graphene prior to being embraced by the protecting polymer layer. Preferably, cathode active material particles and particles of a carbon or graphite material are bonded together by the protecting polymer. Preferably, the cathode active material particles, possibly along with a carbon or graphite material and/or with some internal graphene sheets, are embraced by graphene sheets to form cathode active material particulates, which are then encapsulated by the presently invented protecting polymer layer. The graphene sheets may be selected from pristine graphene (e.g. that prepared by CVD or liquid phase exfoliation using direct ultrasonication), graphene oxide, reduced graphene oxide (RGO), graphene fluoride, doped graphene, functionalized graphene, etc.

BRIEF DESCRIPTION OF THE DRAWINGS

FIG. 1(A) Schematic of a prior art lithium or sodium metal-selenium battery cell, wherein the anode layer is a thin coating or foil of an anode active material (Li or Na metal)

and the cathode is composed of particles of a cathode active material, a conductive additive (not shown) and a resin binder (not shown).

DESCRIPTION OF THE PREFERRED EMBODIMENTS

This invention is directed at the cathode active material layer (positive electrode layer, not including the cathode current collector) containing a cathode active material in a protected particulate form for a lithium-selenium or sodium-selenium battery, which is preferably a secondary battery based on a non-aqueous electrolyte, a polymer gel electrolyte, an ionic liquid electrolyte, a quasi-solid electrolyte, or a solid-state electrolyte. The shape of a lithium or sodium secondary battery can be cylindrical, square, button-like, etc. The present invention is not limited to any battery shape or configuration or any type of electrolyte. The invention also provides such a protected cathode particulate composed of cathode active material particles encapsulated or embraced by a thin layer of a protecting polymer.

In certain embodiments, the invention provides a particulate of a cathode active material for a lithium-selenium or sodium-selenium battery, preferably a rechargeable battery. The cathode active material particulate is composed of one or a plurality of cathode active material particles being fully embraced or encapsulated by a thin layer of a protecting polymer. The cathode active material particles are selected from Se, lithium polyselenide, sodium polyselenide, potassium polyselenide, a Se alloy or mixture with Sn, Sb, Bi, S, or Te, or a combination thereof. The protecting polymer layer preferably has a thickness from 0.5 nm to 5 μm (preferably from 1 nm to 2 μm and more preferably <1 μm), and a lithium ion or sodium ion conductivity from $10^{-8}$ S/cm to $5 \times 10^{-2}$ S/cm at room temperature.

The protecting polymer layer contains a member of a special class of protecting polymers. The protecting polymer member preferably has a a thickness from 0.5 nm to 5 μm (preferably from 1 nm to 2 μm and more preferably <1 μm), and a lithium ion or sodium ion conductivity from $10^{-8}$ S/cm to $5 \times 10^{-2}$ S/cm at room temperature. Specifically, the protecting polymer layer contains a polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, poly(vinylidene chloride), polydimethylsiloxane, poly(vinylidene fluoride)-hexafluoropropylene (PVDF-HFP), polyethylene glycol (PEG), a chemical derivative of PEG, poly (ethylene glycol diacrylate) (PEGDA), polyethylene glycol methyl ether, polyethylene glycol dimethyl ether, a sulfonated polymer, an interpenetrating polymer network thereof, or a combination thereof. The protecting polymer preferably has a lithium/sodium ion conductivity no less than $10^{-6}$ S/cm at room temperature (preferably and more typically no less than $10^{-4}$ S/cm and more preferably and typically no less than $10^{-3}$ S/cm). Preferably, PEO, PAN, or PPO is an ultrahigh molecular weight polymer, having a molecular weight from $0.5 \times 10^6$ to $9.0 \times 10^6$ g/mole, more preferably from $1.0 \times 10^6$ to $6.0 \times 10^6$ g/mole.

Figure 1A:
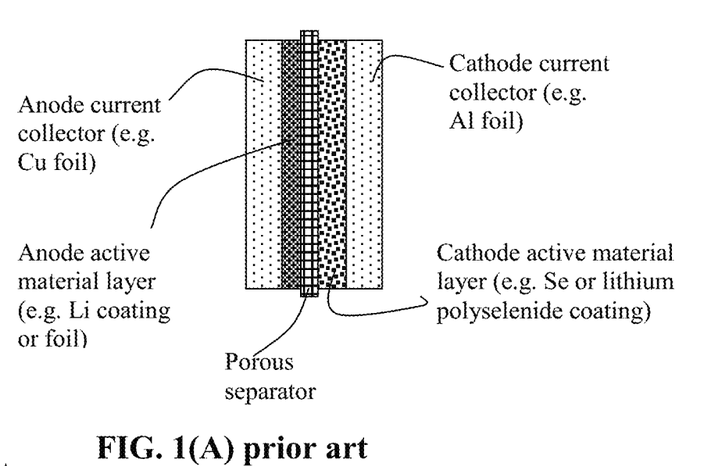
Figure 1B:
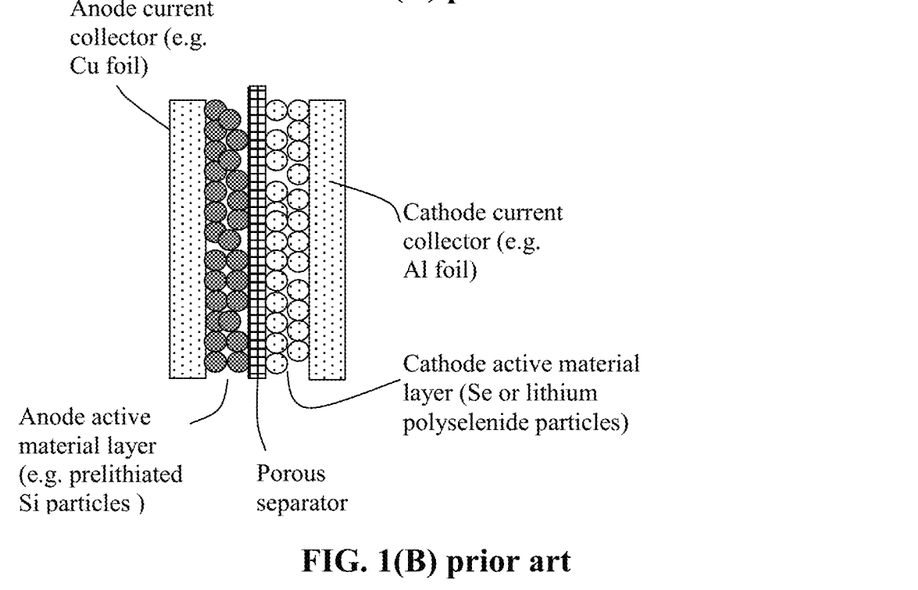
FIG. 1(B) Schematic of a prior art lithium-ion selenium battery; the anode layer being composed of particles of an anode active material (e.g. fully lithiated Si particles), a conductive additive (not shown) and a resin binder (not shown).

As illustrated in FIG. 1(B), a lithium-ion selenium battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. prelithiated Si particles), a conductive additive (e.g. carbon black particles), and a resin binder (e.g. SBR or PVDF). This anode layer is typically 50-300 μm thick (more typically 100-200 μm) to give rise to a sufficient amount of current per unit electrode area. Similarly, the cathode layer is composed of particles of a cathode active material (e.g. Se, lithium polyselenide $Li_2Se_x$, etc.; x=1-8), a conductive additive (e.g. carbon black particles), and a resin binder (e.g. PVDF or PTFE). This cathode layer is typically 100-300 μm thick.

In a lithium metal-selenium cell, as illustrated in FIG. 1(A), the anode active material is deposited in a thin film form or a thin foil form directly onto an anode current collector. If a layer of Li coating or Li foil is used as the anode active material, the battery is a lithium-selenium battery, etc. If a layer of Na is used, the battery is a sodium-selenium cell.

In order to obtain a higher energy density lithium-ion selenium cell, the anode in FIG. 1(B) can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{44}Si$ (4,200 mAh/g), $Li_{44}Ge$ (1,623 mAh/g), $Li_{44}Sn$ (993 mAh/g), $Li_3Cd$ (715 mAh/g), $Li_3Sb$ (660 mAh/g), $Li_{44}Pb$ (569 mAh/g), LiZn (410 mAh/g), and $Li_3Bi$ (385 mAh/g).

One major problem in the current lithium battery is the notion that active material particles can get fragmented and the binder resin can get detached from both the active material particles and conductive additive particles due to volume expansion/shrinkage of the active material particles during the charge and discharge cycles. These binder detachment and particle fragmentation phenomena lead to loss of contacts between active material particles and conductive additives and loss of contacts between the active material and its current collector. These adverse effects result in a significantly shortened charge-discharge cycle life. Another problem is the notion that certain cathode active materials (e.g. S and Se) can be dissolved in the liquid electrolyte and then can migrate to the anode side without return, leading to rapid capacity decay (i.e., the "shuttling effect").

We have solved these challenging issues that have troubled battery designers and electrochemists alike for more than 30 years by developing a new class of cathode active materials. The cathode active material layer comprises multiple cathode active material particles that are fully embraced or encapsulated by a presently invented protecting polymer layer. These cathode active material particles are selected from Se, lithium polyselenide, sodium polyselenide, potassium polyselenide, a Se alloy or mixture with Sn, Sb, Bi, S, or Te, or a combination thereof.

Figure 2:
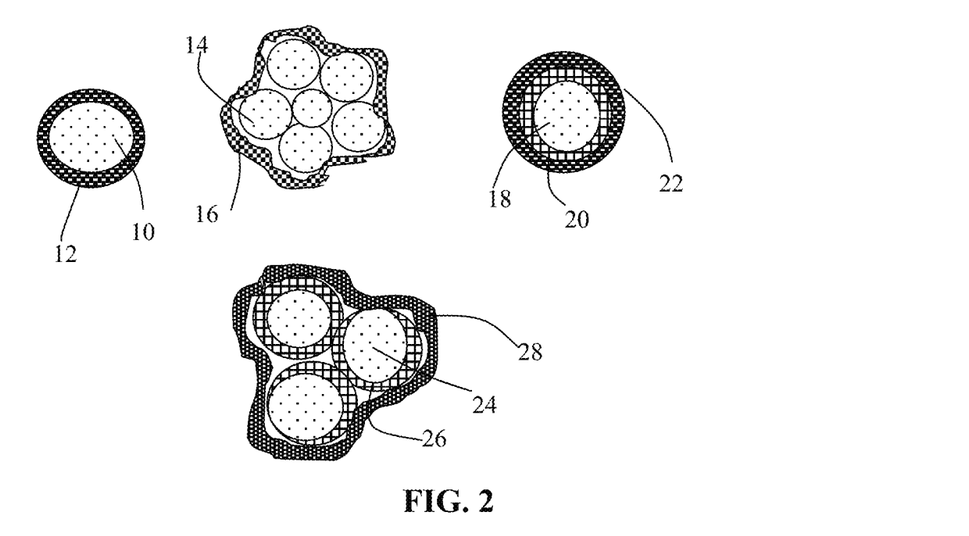
FIG. 2 Several different types of particulates containing protecting polymer encapsulated cathode active material particles (e.g. Se, lithium polyselenide, sodium polyselenide, potassium polyselenide, a Se alloy or mixture with Sn, Sb, Bi, S, or Te, or a combination thereof).

As illustrated in FIG. 2, the present invention provides four major types of particulates of protecting polymer-encapsulated cathode active material particles. The first one is a single-particle particulate containing a cathode active material core 10 encapsulated by a protecting polymer shell 12. The second is a multiple-particle particulate containing multiple cathode active material particles 14 (e.g. Se or Se—S particles), optionally along with other conductive materials (e.g. particles of graphite or hard carbon, not shown), which are encapsulated by a protecting polymer layer 16. The third is a single-particle particulate containing a cathode active material core 18 coated by a carbon or graphene layer 20 (or other conductive material) further encapsulated by a protecting polymer layer 22. The fourth is a multiple-particle particulate containing multiple cathode active material particles 24 (e.g. Se, lithium polyselenide, or sodium polyselenide particles) coated with an electron-conducting material layer 26 (carbon, graphene, etc.), optionally along with other active materials or conductive additive, which are encapsulated by a protecting polymer shell 28.

The particles of the cathode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the cathode active material layer) or prelithiated to a desired extent (up to the maximum capacity as allowed for a specific element or compound).

Production of Se particles, from nanometer to micron scales, is well known in the art and fine Se powders are commercially available. Micron-scaled Se particles are easily produced using ball-milling if the initial powder size is too big. Due to the low melting point (221° C.) of Se, one can easily obtain Se melt and use a melt atomization technique to produce submicron Se particles, for instance. Various methods have been used in the past for synthesizing Se nanoparticle (SeNP), such as chemical reduction method, biological synthesis, solvothermal route, hydrothermal route, microwave assisted synthesis, green synthesis, electrodeposition method, and pulsed laser ablation method. The following references may be consulted for the details of several methods of producing SeNP:

1. Sheng-Yi Zhang, Juan Zhang, Hong-Yan Wang, Hong-Yuan Chen, "Synthesis of selenium nanoparticles in the presence of polysaccharides," Materials Letters, Volume 58, Issue 21, August 2004, Pages 2590-2594
2. Urarika Luesakul, Seamkwan Komenek, Songchan Puthong, Nongnuj Muangsin, "Shape-controlled synthesis of cubic-like selenium nanoparticles via the self-assembly method," Carbohydrate Polymers, Volume 153, 20 Nov. 2016, Pages 435-444.
3. C. Dwivedi, et al., "An Organic Acid-Induced Synthesis and Characterization of Selenium Nanoparticles," Journal of Nanotechnology, 2011: 1-6.
4. Lin, Z., Lin, F. and Wang, C. R. C. "Observation in the Growth of Selenium Nanoparticles," Journal of Chinese Chemical Society, 2004, 51 (2): 239-242.
5. Gao, B. X., Zhang, J. and Zhang, L., "Hollow Sphere Selenium Nanoparticles: Their In-Vitro Anti Hydroxyl Radical Effect," Advanced Materials, 14 (4), (2002) 290-293.
6. Li, Z. and Hua, P. 2009. "Mixed Surfactant Template Method for Preparation of Nanometer Selenium," E-Journal of Chemistry 6 (1) (2009) 304-310.
7. Chen, H., Shin, D., Nam, J., Kwon, K. and Yoo, J. 2010. "Selenium Nanowires and Nanotubes Synthesized via a Facile Template-Free Solution Method," Materials Research Bulletin 45 (6) (2010) 699-704.)
8. Zeng, K., Chen, S., Song, Y., Li, H., Li, F. and Liu, P. 2013, "Solvothermal Synthesis of Trigonal Selenium with Butterfly-like Microstructure," Particuology, 11 (5) (2013) 614-617.)
9. An, C. and Wang, S. 2007. "Diameter-Selected Synthesis of Single Crystalline Trigonal Selenium Nanowires. Materials Chemistry and Physics, 2007, 101 (2-3): 357-361.
10. An, C., Tang, K., Liu, X. and Qian, Y., "Large-Scale Synthesis of High Quality Trigonal Selenium Nanowires. European Journal of Inorganic Chemistry," 2003 (17): 3250-3255.

For instance, the chemical reduction method employs reduction of selenium salt using variety of reducing agents such as surfactants and biocompatible chemicals to obtain stabilized colloidal suspensions of nanoparticles. Various shapes and sizes of SeNP are synthesized using these methods. Chemical reduction method assists in maintaining better uniformity of the particles.

Dwivedi et al. [Ref. 3] used carboxylic acids like acetic acid, oxalic acid and aromatic acid (gallic acid) to synthesize SeNP of spherical shape and size 40-100 nm using sodium selenosulfate as the source of selenium. Lin et al. [Ref 4] used sulfur dioxide and SDS as reducing agents and selenous acid was used as a precursor to synthesize SeNP with a size range of 30-200 nm. Gao et al. [Ref. 5] used β-mercaptoethanol as a reducing agent producing hollow sphere SeNP (HSSN) of size 32 nm.

A mixed surfactant synthesis carried out by Li and Hua [Ref 6] showed the use of dihydroascorbic acid with sodium dodecyl sulfate and polyvinyl chloride to prepare SeNP of size 30 nm. A study reported by Chen et al. [Ref 7] used template free solution to prepare trigonal Nanowires and Nanotubes of 70-100 nm width and 180-350 nm respectively wherein, glucose was selected as a reducing agent and sodium selenite as the selenium source forming α-Se. Recrystallization of these SeNP without template or a surfactant resulted in the transformation of α-Se to t-Se.

The solvothermal or hydrothermal method employs usage of a solvent under high pressure and temperature that involves the interaction of precursors during synthesis. For instance, Zeng et al. [Ref. 8] synthesized nanoparticles using this method wherein, selenium was dissolved in ethylenediamine and kept in a Teflon coated autoclave maintaining the temperature at 160° C. for 2 hour and then cooled to RT to form a brown homogenous solution and then acetone stored at −18° C. was added to this solution to make it amorphous SeNP and further transforming it into trigonal selenium of hexagonal rod shaped structure. These particles on aging acquired a butterfly-like microstructure having 4 μm in width and 8 μm in length.

A study conducted by An & Wang [Ref. 9 and 10] showed synthesis of trigonal selenium Nanowires of 10-60 nm in size using sodium selenite and thiosulfate salts as starting materials. Steam under pressure was used for the synthesis with a set temperature of 180° C.

Once the particles of Se are produced, they can be incorporated into a polymer-liquid medium suspension to make a polymer mixture suspension, dispersion or slurry. This suspension, dispersion, or slurry is then subjected to secondary particle formation treatment, such as spray-drying, spray-pyrolysis, ultrasonic spraying, and vibration-nozzle droplet formation, to make the invented polymer-protected particulates.

The invention also provides a method of manufacturing a lithium-selenium or sodium-selenium battery, comprising: (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically separating the anode and the cathode; wherein the operation of providing the cathode active material layer includes providing multiple particulates of a cathode active material, wherein at least one of the particulates is composed of one or a plurality of cathode active material particles (Se, lithium polyselenide, sodium polyselenide, potassium polyselenide, a Se alloy or mixture with Sn, Sb, Bi, S, or Te, or a combination thereof) being fully embraced or encapsulated by a thin layer of a protecting polymer having a lithium ion conductivity from $10^{-8}$ S/cm to $5\times10^{-2}$ S/cm at room temperature, and a thickness from 0.5 nm to 10 μm. The protecting polymer layer contains a polymer selected from the group consisting of poly(ethylene oxide) (PEO), polypropylene oxide (PPO), poly(acrylonitrile) (PAN), poly(m-ethyl methacrylate) (PMMA), poly(vinylidene fluoride) (PVDF), poly bis-methoxy ethoxyethoxide-phosphazene, polyvinyl chloride, poly(vinylidene chloride), polydimethylsiloxane, poly(vinylidene fluoride)-hexafluoropropylene (PVDF-HFP), polyethylene glycol (PEG), chemical derivatives of PEG, poly(ethylene glycol diacrylate) (PEGDA), polyethylene glycol methyl ether, polyethylene glycol dimethyl ether, sulfonated polymers, interpenetrating polymer networks thereof, and combinations thereof.

The operation of providing the cathode active material layer includes fully embracing or encapsulating particles of a cathode active material by a protecting polymer layer to form protected particulates. The first step for producing encapsulated active material particles is to dissolve a protecting polymer or its precursor in a solvent to form a solution. Subsequently, particles of a cathode active material (e.g. Se, lithium polyselenide, sodium polyselenide, potassium polyselenide, a Se alloy or mixture with Sn, Sb, Bi, S, or Te, or a combination thereof, etc.) are dispersed in a polymer-solvent solution to form a suspension (also referred to as dispersion or slurry) of an active material particle-polymer mixture. This suspension can then be subjected to a solvent removal treatment while individual particles remain substantially separated from one another. The polymer precipitates out to deposit on surfaces of these active material particles. This can be accomplished, for instance, via spray drying, ultrasonic spraying, air-assisted spraying, aerosolization, and other secondary particle formation procedures. These techniques will be further discussed later.

One may also choose to add some lithium salt or sodium salt into the slurry. For instance, the procedure may begin with dissolving polyethylene glycol dimethyl ether (PEG-me) in a liquid solvent (e.g. acetonitrile) to form a solution. A lithium salt, LiPF$_6$, can then be added into the solution at a desired weight percentage. Then, particles of a selected cathode active material are introduced into the mixture solution to form a slurry. The slurry may then be subjected to a micro-encapsulation procedure to produce cathode active material particles coated with an embracing layer of PEG-me containing LiPF$_6$ dispersed therein (in the amorphous zones of the polymer).

The aforementioned protecting polymers may be used alone to encapsulate the cathode active material particles. Alternatively, the protecting polymer can be mixed with a broad array of elastomers, electrically conducting polymers, lithium ion-conducting materials, and/or strengthening materials (e.g. carbon nanotube, carbon nanofiber, or graphene sheets).

A broad array of elastomers can be mixed with a protecting polymer to form a blend, co-polymer, or interpenetrating network that encapsulates the cathode active material particles. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, a protecting polymer can form a polymer matrix composite containing a lithium ion-conducting additive dispersed in the high-elasticity polymer matrix material, wherein the lithium ion-conducting additive is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, $0 \leq x \leq 1$, $1 \leq y \leq 4$.

In some embodiments, the protecting polymer can be mixed with a lithium ion-conducting additive, which contains a lithium salt selected from lithium perchlorate, LiClO$_4$, lithium hexafluorophosphate, LiPF$_6$, lithium borofluoride, LiBF$_4$, lithium hexafluoroarsenide, LiAsF$_6$, lithium trifluoro-metasulfonate, LiCF$_3$SO$_3$, bis-trifluoromethyl sulfonylimide lithium, LiN(CF$_3$SO$_2$)$_2$, lithium bis(oxalato) borate, LiBOB, lithium oxalyldifluoroborate, LiBF$_2$C$_2$O$_4$, lithium oxalyldifluoroborate, LiBF$_2$C$_2$O$_4$, lithium nitrate, LiNO$_3$, Li-fluoroalkyl-phosphates, LiPF$_3$(CF$_2$CF$_3$)$_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The protecting polymer may form a mixture, blend, or semi-interpenetrating network with an electron-conducting polymer selected from polyaniline, polypyrrole, polythiophene, polyfuran, a bi-cyclic polymer, derivatives thereof (e.g. sulfonated versions), or a combination thereof. In some embodiments, the protecting polymer may form a mixture, co-polymer, or semi-interpenetrating network with a lithium ion-conducting polymer.

Unsaturated rubbers that can be mixed with the protecting polymer include natural polyisoprene (e.g. cis-1,4-polyisoprene natural rubber (NR) and trans-1,4-polyisoprene guttapercha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylenevinyl acetate (EVA), thermoplastic elastomers (TPE), protein resilin, and protein elastin. Polyurethane and its copolymers (e.g. urea-urethane copolymer) are particularly useful elastomeric shell materials for encapsulating active material particles.

Several micro-encapsulation processes may be used to encapsulate particles of a cathode active material. These processes typically require the protective polymer or its precursor (monomer or oligomer) to be dissolvable in a solvent. Fortunately, all the protecting polymers or their precursors used herein are soluble in water or some common solvents. The polymer or its precursor can be readily dissolved in water or a common organic solvent to form a solution. This solution can then be used to encapsulate solid particles via several of the micro-encapsulation methods to be discussed in what follows. Upon encapsulation, the polymer shell is then polymerized or cured.

There are three broad categories of micro-encapsulation methods that can be implemented to produce protective polymer-encapsulated particles of an active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the cathode active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Particles of a cathode active material may be encapsulated using a rotating extrusion head containing concentric nozzles. In this process, a stream of core fluid (slurry containing particles of an active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii)

addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

In the following examples, certain protecting polymers were used to illustrate the best mode of practice. Other protecting polymers in the list provided in previous sections can be similarly used. These should not be construed as limiting the scope of invention.

Example 1: Preparation of Se Nanoparticles from $SeO_2$ and Ascorbic Acid

The starting materials include $SeO_2$, ascorbic acid (Vc) and polysaccharides (CTS and CMC, separately). The CTS is a water-soluble chitosan having a 73.5% degree of deacetylation and viscosity-average molecular weight of 4200; and CMC is carboxymethyl cellulose having a degree of substitution of 0.8 and molecular weight of 110,000. The aqueous solutions of the materials were obtained by, for instance, dissolving 0.4 g of $SeO_2$ in 150 mL of de-ionized water under vigorous stirring.

For the preparation of selenium nanoparticles, appropriate amounts of polysaccharides, such as CTS or CMC solutions, were mixed with selenious acid solution (the aqueous solution of $SeO_2$), respectively. Subsequently, the ascorbic acid solution was added into the mixtures to initiate the reaction. In the reaction solution, the typical concentrations of CTS, CMC, selenious acid and ascorbic acid were 0.04%, 0.25%, $1\times10^{-3}$ and $4\times10^{-3}$M, respectively. No stirring was conducted except the initial mixing of the reactants. The selenious acid solutions were converted from colorless to red gradually after the addition of the ascorbic acid. The resulting product mixtures were then dried in a vacuum oven to collect Se nanoparticle powders. The reactions may be accelerated by using a slightly higher temperature (e.g. 80° C. instead of room temperature) and/or assisted by ultrasonic treatment.

Example 2: Preparation of Se Nanoparticles and Graphene-Wrapped Se from $Na_2SeO_3$ and GO

Hollow and solid Se nanospheres were produced from $Na_2SeO_3$ by varying the amount of cetyltrimethyl ammonium bromide (CTAB) in the reaction system. In a representative procedure, 0.025 mol of sodium selenite ($Na_2SeO_3$) and 0.05 mol of ascorbic acid were separately dissolved in 50 mL mixed solution (Vwater/Vethanol=1:1) with the assistance of CTAB at ambient temperature. After adding the ascorbic acid, the red solution turned to brick red. The color phenomenon was due to the formation of α-Se particles. After 18 h, the products were washed with water and absolute ethanol. Subsequently the product changed progressively from red to gray, indicating that the amorphous Se phase had transformed to a trigonal phase (t-Se). The content of CTAB could be changed to get different morphologies of the nano Se.

Example 3: Preparation of Selenium Nanowires

Selenium nanowires were synthesized from $SeO_2$. In a typical reaction process, $SeO_2$ (0.25 g) and β-cyclodextrin (0.25 g) were added into a glass beaker containing 50 mL distilled water. The mixture was stirred for about 10 min to give a clear solution, which was promptly poured into another glass beaker containing ascorbic acid solution (50 mL, 0.0281) under continuous stirring. After reacting for 4 h, the product was collected by centrifugation and washed with deionized water and absolute ethanol several times. Then it was re-dispersed in ethanol and allowed to age for 2 h without stirring. Subsequently, the products were dried in a vacuum at 60° C. for 5 h to recover Se nanowires.

Example 4: Hydrothermal Synthesis of Se Nanowires from $(NH_4)_2S_2O_3$ and $Na_2SeO_3$ A low-temperature hydrothermal synthesis route was conducted for direct production of crystalline trigonal selenium nanowires, using $(NH_4)_2S_2O_3$ and $Na_2SeO_3$ as the starting materials in the presence of a surfactant, sodium dodecyl sulfate (SDS). In a typical procedure, equivalent molar amounts of $(NH_4)_2S_2O_3$ and $Na_2SeO_3$ (10 mmol) were added to an aqueous solution (50 mL) of SDS (0.325 g). The solution was stirred for approximately 20 min until the solids had completely dissolved, and a 0.2 M homogeneous solution was formed. The solution was then transferred to a Teflon-lined autoclave having a capacity of 60 mL. The autoclave was sealed and heated at 110° C. for 17 h, and then allowed to cool to room temperature naturally over a period of about 5 h. The resulting precipitate was rinsed with distilled water and absolute alcohol several times. After drying in vacuo at 40° C. for 4 h, the orange-red powders were collected. The hydrothermal synthesis of t-Se nanowires may be described by the following chemical reaction:

The product yield was approximately 95%.

Example 5: Preparation of Se Nanoplatelets

In a typical synthesis procedure, 1 mmol commercial Se powder and 20 mL ethylenediamine were poured into a Teflon-lined autoclave with a capacity of 30 mL. The autoclave was sealed and maintained at 160° C. for 2 h and then cooled to room temperature to produce a brown homogeneous solution. Subsequently, 100 mL acetone at −18° C. was injected into the brown homogeneous solution, and a brick-red mixture was obtained. After aging the brick-red mixture for 24 hours at −18° C., the precipitates were centrifuged, washed several times with distilled water and absolute alcohol, and finally dried in air at 60° C. for 24 h. The powder was then subjected to ball-milling for 30-60 minutes to obtain Se nanoplatelets. Some of the Se nanoplatelets were poured into a graphene suspension obtained in Example 9 to make a slurry, which was spray-dried to yield pristine graphene-wrapped Se nanoplatelets.

Example 6: Preparation of Tetragonal Selenium Nanowires and Nanotubes

In a typical procedure of synthesizing Se nanowires, 0.52 g $Na_2SeO_3$ and 2 g glucose were dissolved in 320 mL water hosted in a 500 mL beaker. After mixing for 20 min under vigorous magnetic stirring, the beaker containing the mixture solution was sealed and maintained in an oven at 85° C. A hot turbid brick-red solution was obtained, indicating the amorphous selenium being generated. The hot solution was cooled down by cold water in order to quench the reaction. The product was collected by centrifugation and washed several times with deionized water to remove the impurities. The final brick-red product was re-dispersed in 10 mL absolute ethanol to form a dispersion in a glass bottle, and then sealed and stored in darkness for further growth of Se nanowires. After this dispersion was aged for one week at room temperature, a sponge-like black-gray solid (containing Se nanowires) was formed at the bottom and the color of upper solution changed to colorless transparent. The synthesis of Se nanotubes was conducted under different conditions: 1.03 g $Na_2SeO_3$ and 3 g glucose were dissolved in 100 mL water hosted in a 250 mL beaker. After the solution was under constant stirring for 20 min, the beaker containing the mixture solution was sealed and then maintained at 85° C. for 4 h in an oven.

Example 7: Cathode Active Material Layers Containing Polyethylene Glycol (PEG)-Encapsulated Se Nanoparticles Selected amounts of Se particles and graphene-embraced Se particles, respectively, were each made into PEG polymer-encapsulated particulates according to the following procedure: PEG was dissolved in DI-water (1.6 wt. %) to form a homogenous and clear solution first. Then, two routes were followed to prepare polymer-encapsulated Se particles and graphene-embraced Se particles. In the first route, Se particles and graphene-embraced Se particles, respectively, were dispersed in the PEG-water solution to form a slurry. In some samples, 0.5%-5% of a conductive filler (e.g. graphene sheets) was added into the slurry. The slurries were separately spray-dried to form particulates of polymer-encapsulated Se and graphene-embraced Se particles.

In the second route, 1-45% of lithium salt ($LiClO_4$) was dissolved in the solution to form a series of lithium-salt containing solutions. Then, Se particles or graphene-embraced Se particles were dispersed in the lithium-containing PEG-water solution to form a series of slurries. In some samples, 0.5%-5% of a conductive filler (e.g. carbon black) was added into the slurry. Each slurry was spray-dried to form particulates of polymer- or polymer/lithium salt-encapsulated Se or graphene-embraced Se particles. The polymer or polymer/lithium salt shell can contain some conducting material.

Some of the particulate samples were subsequently soaked in a solvent (e.g. ethylene carbonate, EC, propylene carbonate, PC, and ether-based solvents), allowing the solvent to permeate into the amorphous zones of the polymer phase embracing the anode particles. The polymer shell thickness was varied from 35 nm to 255 nm.

For electrochemical testing, a comparative electrode using a conventional cathode (no encapsulation) was also prepared. The working electrodes were prepared by mixing 85 wt. % Se or 88% of graphene-embraced Se particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter/reference electrode, Celgard 2400 membrane as a separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using an electrochemical workstation at a scanning rate of 1 mV/s. The electrochemical performance of the lithium-selenium cells was evaluated by galvanostatic charge/discharge cycling at a current density of 50 mA/g using an Arbin electrochemical workstation.

Figure 3:
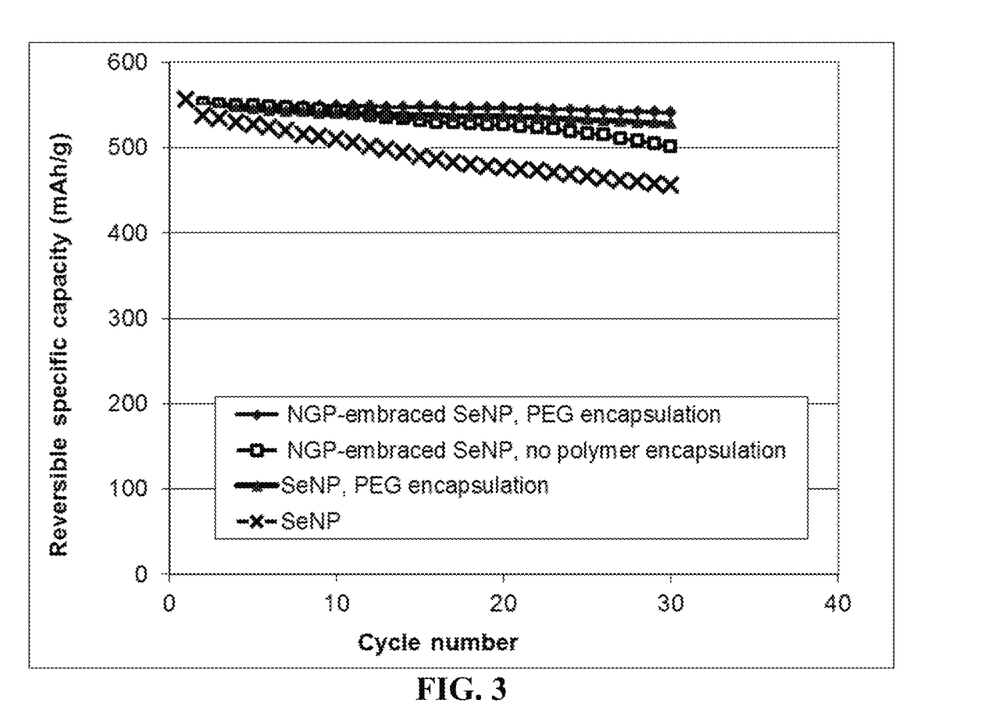
FIG. 3 The specific intercalation capacity curves of four lithium cells: cathode containing un-encapsulated Se nanoparticles, cathode containing un-encapsulated but graphene-embraced Se nanoparticles, cathode containing PEG-encapsulated Se nanoparticles, and cathode containing PEG-encapsulated graphene-embraced Se nanoparticles.

Summarized in FIG. 3 are the specific capacity curves of four lithium cells: cathode containing un-encapsulated Se particles, cathode containing un-encapsulated but graphene-embraced Se particles, cathode containing PEG polymer-encapsulated Se particles, and cathode containing PEG polymer-encapsulated graphene-embraced Se particles. As the number of cycles increases, the specific capacity of the un-encapsulated Se electrode drops at the fastest rate. In contrast, the presently invented PEG polymer encapsulation provides the battery cell with a significantly more stable and high specific capacity for a large number of cycles. These data have clearly demonstrated the surprising and superior performance of the presently invented PEG polymer encapsulation approach.

The protecting polymer encapsulation shell appears to be capable of reversibly deforming to a great extent without breakage when the cathode active material particles (Se) expand and shrink. The polymer also remains chemically bonded to the binder resin when the encapsulated particles expand or shrink. These were observed by using SEM to examine the surfaces of the electrodes recovered from the battery cells after some numbers of charge-discharge cycles.

Example 8: Polyethylene Glycol Methyl Ether-Embraced Li₂Se Particles

The protecting polymer for encapsulation of $Li_2Se$ particles was based on medium molecular (220,000 g/mole) polyethylene glycol methyl ether (PEG-me). In a typical procedure, PEG-me (0.3 g) was dissolved in 5 ml of ethanol to form a solution. The $Li_2Se$ particles were then dispersed in the solution to form a slurry. The slurries were then subjected to a micro-encapsulation procedure (spray-drying) to produce cathode active material particles having entire exterior surfaces being coated with an embracing polymer layer.

Figure 4:
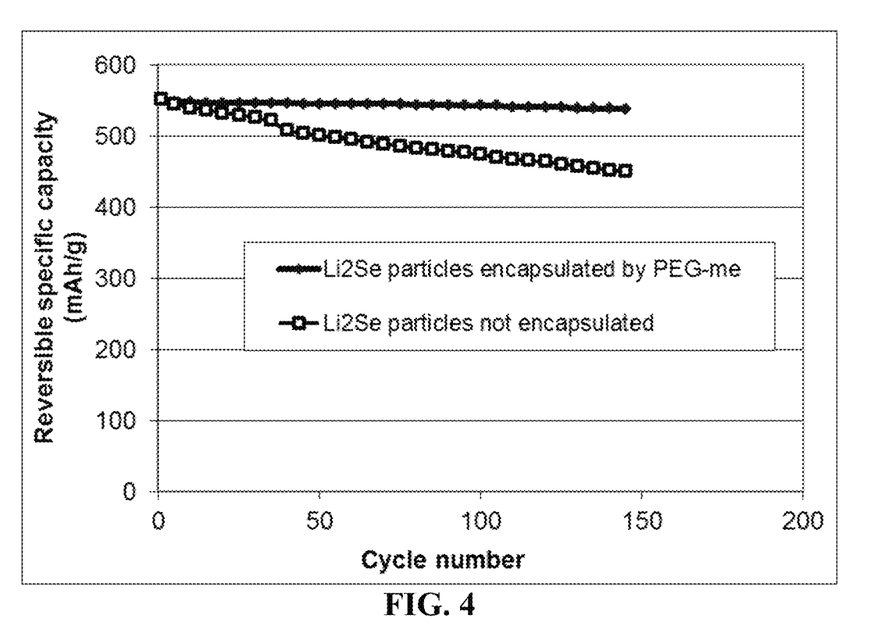
FIG. 4 The specific capacity values of two lithium battery cells having a cathode active material featuring (1) polyethylene glycol methyl ether (PEG-me)-encapsulated carbon-coated $Li_2Se$ particles and (2) carbon-coated $Li_2Se$ particles without polymer encapsulation, respectively.

The battery cells from the polymer-encapsulated carbon-coated $Li_2Se$ particles and non-encapsulated carbon-coated $Li_2Se$ particles were prepared using a procedure similar to that described in Example 7. FIG. 4 shows that the cathode prepared according to the presently invented protecting polymer encapsulation approach offers a significantly more stable cycling behavior and higher reversible capacity compared to the non-encapsulated $Li_2Se$ particle-based cathode. The protecting polymer is more capable of holding the active material particles and conductive additive together, significantly improving the structural integrity of the cathode active material electrode. The protecting polymer also acts to prevent selenium polysulfide or reduced Se from dissolving in the electrolyte, yet still allowing for easy diffusion of lithium ions.

Example 9: Se Nanowires Encapsulated by a PPO

For encapsulation of Se nanowires, a PPO polymer was implemented as an embracing polymer shell by using a procedure similar to that described in Example 7. The Se nanowires (prepared in Example 3), along with graphene sheets (as a conductive additive), was then added into a PPO-solvent liquid suspension to form a multiple-component slurry. The slurry was then spray-dried to form a mass of particulates containing polymer embraced Se nanowires.

Figure 5:
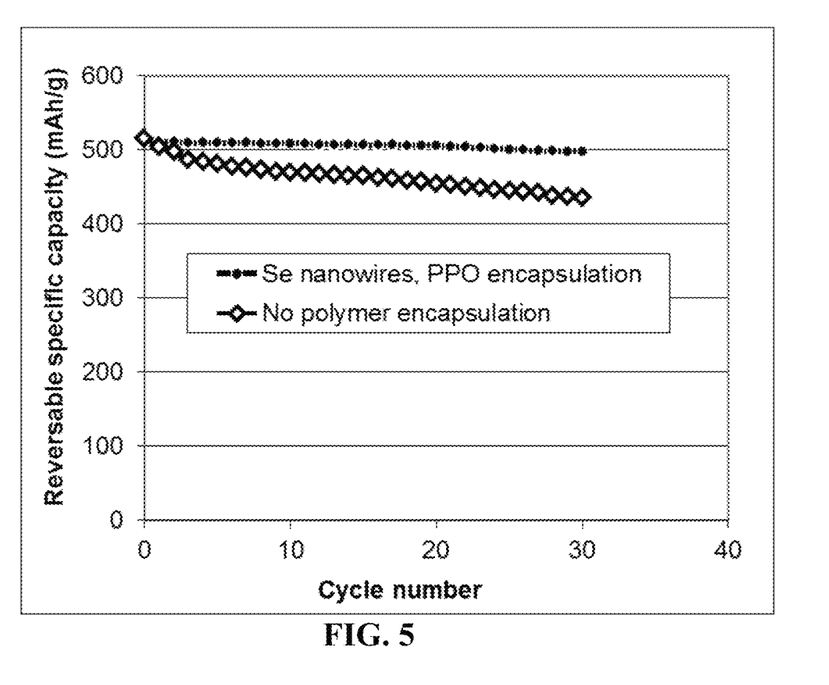
FIG. 5 The discharge capacity curves of two coin cells having two different types of cathode active materials: (1) ultra-high molecular weight PPO-encapsulated Se nanowires and (2) non-encapsulated Se nanowires.

Shown in FIG. 5 are the discharge capacity curves of two coin cells of Li—Se having two different types of cathode active materials: (1) PPO polymer-encapsulated Se nanowires and (2) non-encapsulated Se nanowires. These results have clearly demonstrated that the protecting polymer encapsulation strategy provides excellent protection against capacity decay of a lithium metal-selenium battery featuring a high-capacity cathode active material.

The protecting polymer appears to be capable of reversibly deforming without breakage when the cathode active material particles expand and shrink. The protecting polymer has contributed to the structural stability of the electrode layer. These were observed by using SEM to examine the surfaces of the electrodes recovered from the battery cells after some numbers of charge-discharge cycles. The protecting polymer also acts to prevent selenium polysulfide or Se from dissolving in the electrolyte.

Example 10: Effect of Lithium Ion-Conducting Additive in a Protecting Polymer A wide variety of lithium ion-conducting additives were added to several different polymer matrix materials to prepare encapsulation shell materials for protecting core particles of a cathode active material. The lithium ion conductivity vales of the resulting polymer/salt complex materials are summarized in Table 1 below. We have discovered that these polymer composite materials are suitable encapsulation shell materials for Se-based active materials provided that their lithium ion conductivity at room temperature is no less than $10^{-8}$ S/cm. With these materials, lithium ions appear to be capable of readily diffusing in and out of the encapsulation shell having a thickness no greater than 1 μm. For thicker shells (e.g. 1 μm), a lithium ion conductivity at room temperature no less than $10^{-5}$ S/cm would be required.

TABLE 1

Lithium ion conductivity of various protecting polymer compositions as a shell material for protecting anode active material particles.

| Sample No. | Lithium-conducting additive | Polymer + PC or EC (1-2 μm thick) | Li-ion conductivity (S/cm) |
|---|---|---|---|
| UE-1p | $Li_2CO_3 + (CH_2OCO_2Li)_2$ | 70-99% PEO | $2.5 \times 10^{-4}$ to $3.6 \times 10^{-3}$ S/cm |
| UE-2p | $Li_2CO_3 + (CH_2OCO_2Li)_2$ | 65-99% PAN | $5.6 \times 10^{-4}$ to $3.3 \times 10^{-3}$ S/cm |
| UE-3p | $Li_2CO_3 + (CH_2OCO_2Li)_2$ | 65-99% PEO + PPO | $9.5 \times 10^{-4}$ to $4.7 \times 10^{-3}$ S/cm |
| UD-4p | $Li_2CO_3 + (CH_2OCO_2Li)_2$ | 70-99% PMMA | $9.7 \times 10^{-5}$ to $4.3 \times 10^{-4}$ S/cm |
| UD-5p | $Li_2CO_3 + (CH_2OCO_2Li)_2$ | 75-99% PVDF-HFP | $8.1 \times 10^{-5}$ to $1.2 \times 10^{-3}$ S/cm |
| UB1p | $LiF + LiOH + Li_2C_2O_4$ | 60-90% PVDF-HFP | $9.6 \times 10^{-5}$ to $2.3 \times 10^{-3}$ S/cm |
| UB2p | LiF + HCOLi | 80-99% PVDF-HFP | $4.6 \times 10^{-5}$ to $4.9 \times 10^{-4}$ S/cm |
| UB3p | LiOH | 70-99% PPO | $4.6 \times 10^{-3}$ to $3.2 \times 10^{-2}$ S/cm |
| UB4p | $Li_2CO_3$ | 70-99% PPO | $3.1 \times 10^{-3}$ to $9.9 \times 10^{-3}$ S/cm |
| UB5p | $Li_2C_2O_4$ | 70-99% PPO | $1.9 \times 10^{-3}$ to $1.7 \times 10^{-2}$ S/cm |
| UB6p | $Li_2CO_3 + LiOH$ | 70-99% PEG | $1.9 \times 10^{-3}$ to $2.5 \times 10^{-2}$ S/cm |
| UC1p | $LiClO_4$ | 70-99% PEO | $4.8 \times 10^{-4}$ to $2.8 \times 10^{-3}$ S/cm |
| UC2p | $LiPF_6$ | 70-99% PEO | $5.5 \times 10^{-4}$ to $8.5 \times 10^{-3}$ S/cm |
| UC3p | $LiBF_4$ | 70-99% PEGDA | $1.2 \times 10^{-4}$ to $1.8 \times 10^{-3}$ S/cm |
| UC4p | $LiBOB + LiNO_3$ | 70-99% PEGDA | $2.4 \times 10^{-4}$ to $4.6 \times 10^{-3}$ S/cm |
| US1p | Sulfonated polyaniline | 85-99% PAN | $5.8 \times 10^{-5}$ to $9.2 \times 10^{-4}$ S/cm |
| US2p | Sulfonated SBR | 85-99% PEG-de | $1.7 \times 10^{-4}$ to $2.2 \times 10^{-3}$ S/cm |
| US3p | Sulfonated PVDF | 80-99% PEG | $3.3 \times 10^{-4}$ to $4.4 \times 10^{-4}$ S/cm |

Example 11: Cycle Stability of Various Rechargeable Lithium-Selenium Battery Cells In lithium battery industry, it is a common practice to define the cycle life of a battery as the number of charge-discharge cycles that the battery suffers 20% decay in capacity based on the initial capacity measured after the required electrochemical formation. Summarized in Table 2 below are the cycle life data of a broad array of batteries featuring presently invented cathode electrodes containing cathode active material particles encapsulated by different protecting polymers.

TABLE 2

Cycle life data of various lithium-selenium secondary (rechargeable) batteries.

| Sample ID | Encapsulation polymer | Type & % of cathode active material (typically 0-5% protecting polymer) | Initial capacity (mAh/g) | Cycle life (No. of cycles) |
|---|---|---|---|---|
| SeNP-1e | PEO | 85% by wt. Se nanoparticles (75 nm) + 7% graphite + 6% binder | 556 | 705 |
| SeNP-2e | none | 85% by wt. Se nanoparticles (75 nm) + 7% graphite + 8% binder | 544 | 85 |
| SeNW-1e | none | 85% by wt. Se nanowires + 7% graphene + 8% binder | 560 | 450 |
| SeNW-2e | PAN | 85% by wt. Se nanowires + 6% graphene + 6% binder | 562 | 1,180 |
| SeNW-1e | PPO | 90% C-coated Se nanowires + 2% CNT + 6% binder | 582 | 1,645 |
| SeNW-2e | none | 90% C-coated Se nanowires + 4% CNT + 6% binder | 577 | 245 |
| SeNPL-1e | 80% PEO + 20% polyaniline | 81% Se nanoplatelets + 8% carbon black + 6% binder | 538 | 1,520 |
| SeNPL-2e | none | 81% Se nanoplatelets + 12% carbon black + 7% bonder | 525 | 125 |
| SeNP-6e | PEO + 1% graphene | 85% Se nanoparticles + 6% graphite platelets + 6% binder | 558 | 1,255 |
| SeNP-6e | none | 85% Se nanoparticles + 9% graphite platelets + 6% binder | 555 | 102 |

These data further confirm that the protecting polymer encapsulation strategy is surprisingly effective in alleviating the cathode capacity decay problems. It appears that the protecting polymer helps to maintain structural integrity of the electrode. Further, the protecting polymer encapsulation layer prevents dissolution of Se materials in the liquid electrolyte, which otherwise would lead to fast loss of the active material and, thus, capacity loss.

We claim:

1. A particulate of a cathode active material for a lithium-selenium, sodium-selenium, or potassium-selenium battery, said particulate comprising one or a plurality of cathode active material particles being embraced or encapsulated by a thin layer of a protecting polymer having a lithium ion conductivity from $10^{-8}$ S/cm to $5 \times 10^{-2}$ S/cm at room temperature, and a thickness from 0.5 nm to 10 µm, wherein said cathode active material particles are selected from lithium polyselenide, sodium polyselenide, potassium polyselenide, a Se alloy or mixture with Sn, Sb, Bi, or Te, or a combination thereof or Se mixed with Sn, Sb, or Bi, or a combination thereof and wherein said protecting polymer layer contains a polymer selected from the group consisting of polypropylene oxide (PPO), poly bis-methoxy ethoxyethoxide-phosphazene, poly(vinylidene chloride), polydimethylsiloxane, poly(vinylidene fluoride)-hexafluoropropylene (PVDF-HFP), chemical derivatives of PEG, poly(ethylene glycol diacrylate) (PEGDA), polyethylene glycol methyl ether (PEG-me), polyethylene glycol dimethyl ether (PEG-de), interpenetrating polymer networks thereof, and combinations thereof.

2. The particulate of claim 1, wherein said protecting polymer layer contains a lithium salt dispersed between chains of said protecting polymer.

3. The particulate of claim 1, wherein said protecting polymer layer contains an electrically conductive material dispersed therein.

4. The particulate of claim 3, wherein said electrically conducting material is selected from an electron-conducting polymer, a metal particle or wire, a graphene sheet, a carbon fiber, a graphite fiber, a carbon nanofiber, a graphite nanofiber, a carbon nanotube, a graphite particle, an expanded graphite flake, an acetylene black particle, or a combination thereof wherein said electrically conducting material has a thickness or diameter less than 100 nm.

5. The particulate of claim 1, wherein said protecting polymer layer contains a lithium salt dispersed therein wherein said lithium salt is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-fluoroalkyl-phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

6. The particulate of claim 1, wherein said protecting polymer layer has a thickness from 1 nm to 1 µm.

7. The particulate of claim 1, wherein said protecting polymer layer has a thickness less than 100 nm.

8. The particulate of claim 1, wherein said the particulate is substantially or spherical or ellipsoidal in shape.

9. The particulate of claim 1, wherein said protecting polymer layer has a lithium ion conductivity from $10^{-5}$ S/cm to $10^{-2}$ S/cm.

10. The particulate of claim 1, wherein said cathode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

11. The particulate of claim 1, wherein one or a plurality of said particles is coated with a layer of carbon or graphene.

12. The particulate of claim 1, wherein said protective polymer layer is a neat polymer having no additive or filler dispersed therein.

13. The particulate of claim 1, wherein said protective polymer layer contains from 0.1% to 50% by weight of a lithium ion-conducting additive dispersed therein or contains therein from 0.1% by weight to 10% by weight of a reinforcement nanofilament selected from carbon nanotube, carbon nanofiber, graphene, or a combination thereof.

14. The particulate of claim 1, wherein said protective polymer layer contains a lithium ion-conducting additive dispersed therein to form a composite wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

15. The particulate of claim 1, wherein said protective polymer layer further contains an electron-conducting polymer mixed with said protecting polymer and said electron-conducting polymer is selected from polyaniline, polypyrrole, polythiophene, polyfuran, a bi-cyclic polymer, a sulfonated derivative thereof, or a combination thereof to form a blend, co-polymer, or semi-interpenetrating polymer network.

16. A powder mass containing a plurality of particulates as defined in claim 1.

17. A cathode active material layer containing multiple particulates of claim 1, an optional conductive additive, and an optional binder that bonds said multiple particulates together.

18. A lithium-selenium battery containing an optional anode current collector, an anode active material layer, a cathode active material layer as defined in claim 17, an optional cathode current collector, an electrolyte in ionic contact with said anode active material layer and said cathode active material layer, and an optional porous separator.

19. The lithium-selenium battery of claim 18, which is a rechargeable lithium-selenium cell or lithium ion-selenium cell.

* * * * *